(12) United States Patent
Frauenhofer et al.

(10) Patent No.: US 8,383,246 B2
(45) Date of Patent: Feb. 26, 2013

(54) POLYPROPYLENE-BASED SHRINK FILMS

(75) Inventors: Lori A. Frauenhofer, Fairport, NY (US); Lindsay J. Mendes, Fairport, NY (US); Eric W. Bender, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 867 days.

(21) Appl. No.: 12/125,592

(22) Filed: May 22, 2008

(65) Prior Publication Data

US 2009/0291284 A1    Nov. 26, 2009

(51) Int. Cl.
*B32B 27/32*    (2006.01)
(52) U.S. Cl. .................... 428/515; 264/211.12
(58) Field of Classification Search .............. 428/515; 264/211.12
See application file for complete search history.

(56) References Cited

U.S. PATENT DOCUMENTS

| | | |
|---|---|---|
| 2,241,030 A | 5/1941 | Hess |
| 6,025,079 A | 2/2000 | Ciocca et al. |
| 6,242,084 B1 | 6/2001 | Peet |
| 6,908,687 B2 | 6/2005 | Mendes et al. |
| 6,984,696 B2 | 1/2006 | Curry et al. |
| 7,351,478 B2 | 4/2008 | Hanyu et al. |
| 7,537,829 B2 | 5/2009 | Pellingra, Jr. et al. |
| 2003/0068453 A1 | 4/2003 | Kong |
| 2003/0152792 A1 | 8/2003 | Takayasu et al. |
| 2007/0251572 A1 | 11/2007 | Hoya et al. |
| 2009/0105418 A1 | 4/2009 | Dharmarajan et al. |
| 2009/0136698 A1 | 5/2009 | Rehkugler et al. |
| 2009/0197022 A1 | 8/2009 | Lu et al. |
| 2009/0220757 A1 | 9/2009 | Patel et al. |

FOREIGN PATENT DOCUMENTS

| | | |
|---|---|---|
| JP | 2005139277 | 6/2005 |
| JP | 2006016597 | 1/2006 |
| JP | 2006346976 | 12/2006 |
| WO | 03 040442 | * 5/2003 |
| WO | 2007 058783 | * 5/2007 |

OTHER PUBLICATIONS

Fan et al. Effects of pre-stretching on the tensile properties of knitted glass fiber fabric reinforced polypropylene composite, Journal of Theremoplastic Composite Materials, 19(4) (2006) 399-411.*
Moore, Jr., Editor, Polypropylene Handbook, Polymerization, Characterization, Properties, Processing, Applications, Hanser Publishers, 1996, pp. 238-239 and 250-251.

* cited by examiner

*Primary Examiner* — Kuo-Liang Peng
(74) *Attorney, Agent, or Firm* — Kevin M. Faulkner

(57) ABSTRACT

In one aspect is provided a film, a shrink sleeve film in a particular embodiment, comprising at least one core layer, one skin layer, and optionally one tie layer between the two, wherein the core comprises from 0 to 30 wt % polypropylene by weight of the core layer, and from 70 to 100 wt % of a random propylene-α-olefin copolymer having within the range of from 1 to 10 wt % α-olefins, the α-olefin selected from the group consisting of ethylene and $C_4$ to $C_{12}$ α-olefins, and having an MWD within the range of from 1.2 to 4.5 and a melting point within the range of from 110 to 150° C.; wherein the film possesses a TD Tensile Strength of from 100 to 400 MPa and a MD Tensile Strength of from 20 to 60 MPa. In a particular embodiment, the at least one skin layer comprises a solvent sealable material.

21 Claims, No Drawings

POLYPROPYLENE-BASED SHRINK FILMS

FIELD OF THE INVENTION

The present invention relates in general to propylene-based films, and in particular to propylene-based shrink films incorporating solvent sealable skin layers such as styrenic or polyester skins, the propylene-based films are suitable for shrink sleeve films.

BACKGROUND OF THE INVENTION

Shrink labels represent a high growth area for labels, particularly for high shrink sleeve labels. There is a growing trend toward use of contoured containers with shrink sleeve labels having unique 360° graphics to provide a trademark package with high customer appeal.

Current high shrink films include those made from polyvinylchloride (PVC), polyethylene teraphthalate glycol (PETG) or co-polyesters, and oriented polystyrene (OPS). All of these provide over 50% TD (transverse direction) shrinkage and are solvent-sealable, ideal qualities for use as sleeve labels. Although they provide very good shrink properties, all of these films have some deficiencies. Recyclability is a major issue, especially with the growth of PET bottles. PVC and PETG have densities similar to PET, and therefore cannot be separated from the bottle material during the recycle process. PVC will contaminate the PET, and also suffers from a negative environmental perception. The density of OPS is different enough from PET for separation, but since its density is slightly greater than 1.0 g/cm$^3$, it won't float in a standard water separation recycle stream. Storage stability, or lack thereof, is another area for improvement of currently available shrink sleeve films. Due to the low shrink onset temperatures of these materials, the moderately high temperatures seen during transport and storage will result in some shrinkage and therefore poor roll quality. These films must be kept refrigerated during transport and storage and have a recommended usable life of less than 6 months. Additionally, film cost is high, especially for PETG/co-polyester films.

Oriented polypropylene (OPP) films can be used in shrink labels, although they are best suited for lower shrink (i.e. <25% shrink) applications. These are typically MD (machine direction) shrink films for roll-fed label applications, using a hot melt adhesive for the seam. Current OPP shrink films are limited by the overall amount of shrink, high temperatures needed for shrinking, and hot melt seaming technology. Otherwise, OPP films do have benefits in cost, recyclability, and storage temperature stability.

There have been some disclosures of OPP-containing shrink films. Bioriented films produced using a tenter process for polyethylene based films is described in U.S. Pat. No. 2,241,030. Shrink films comprising a blend of a polypropylene with ethylene-based polymers are disclosed in U.S. Pat. No. 6,908,687. An oriented film comprising metallocene-produced polypropylene is disclosed in U.S. Pat. No. 6,242,084, wherein at least one layer is "voided" to increase the oxygen and water vapor transmission. Voiding may be useful for food wrap films, but not necessarily for shrink wrap films for labels. A polypropylene containing core layer is described in shrink films disclosed in U.S. Pat. No. 6,025,079, but the outer ("skin") layers are not solvent sealable. A metallocene produced propylene copolymer for use in a heat-sealable skin layer of a film is disclosed in U.S. Pat. No. 7,351,478. None of these disclosures fully solves the problem of providing a solvent-sealable, recyclable oriented film for shrink sleeve labels.

It is therefore desirable to produce a high shrink film that is solvent sealable, thermally stable during transport/storage, cost effective, and has density less than 1.0 g/cm$^3$ for recyclability.

SUMMARY OF THE INVENTION

In one aspect is provided a film comprising at least one core layer, at least one skin layer, and optionally at least one tie layer between the two, wherein the core comprises from 0 to 30 wt %, by weight of the core layer, polypropylene by weight of the core layer, and from 70 to 100 wt %, by weight of the core layer, of a random propylene-α-olefin copolymer comprising within the range of from 1 to 10 wt % α-olefins, the α-olefin selected from the group consisting of ethylene and $C_4$ to $C_{12}$ α-olefins, and having an MWD within the range of from 1.2 to 4.5 and a melting point within the range of from 110 to 150° C.; wherein the film possesses a TD Tensile Strength within the range of from 100 to 400 MPa and a MD Tensile Strength within the range of from 20 to 60 MPa.

In a particular embodiment, the at least one skin layer comprises a solvent sealable material; and in a more particular embodiment comprises a styrenic copolymer or a polyester copolymer.

In another particular embodiment, the at least one tie layer, when present, comprises a skin layer- and core layer-adherable material; and in a more particular embodiment comprises a styrenic copolymer, a polar-modified polyolefin or an ethylene-ester copolymer.

In yet another aspect is a film comprising at least one skin layer, at least one core layer, and optionally at least one tie layer between each, wherein, independently, at least one skin layer comprises a styrenic copolymer or a polyester copolymer; at least one core layer consists essentially of (i) from 0 to 30 wt %, by weight of the core layer, of polypropylene, and (ii) from 70 to 100 wt %, by weight of the core layer, of a random propylene-α-olefin copolymer comprising within the range of from 1 to 10 wt % α-olefins, by weight of the copolymer, the α-olefin selected from the group consisting of ethylene and $C_4$ to $C_{12}$ α-olefins, and having an MWD within the range of from 1.2 to 4.5 and a melting point within the range of from 110 to 150° C. In certain embodiments, the at least one tie layer, when present, comprises a styrenic copolymer, a polar-modified polyolefin or a ethylene-ester copolymer.

In another aspect is a process for forming a film comprising coextruding through a die at least one core layer, at least one skin layer, and one tie layer between the two to form an unoriented film, followed by drawing the unoriented film within the range of from 1.1 to 2.5-fold in the machine direction and within the range of from 4 to 10-fold in the transverse direction; and followed by isolating a biaxially oriented film; wherein the core layer consists essentially of from 0 to 30 wt %, by weight of the core layer, of polypropylene, and from 70 to 100 wt %, by weight of the core layer of a random propylene-α-olefin copolymer having within the range of from 1 to 10 wt % α-olefins, the α-olefin selected from the group consisting of ethylene and $C_4$ to $C_{12}$ α-olefins, and having an MWD within the range of from 1.2 to 4.5 and a melting point within the range of from 110 to 150° C.

In particular embodiments of the film and process, the film's TD shrinkage is greater than 40% or 50% at a given temperature within the range of from 110 to 115 or 120 or 125° C., while the film's MD shrinkage is less than 10 or 15% at a given temperature within the same temperature ranges.

In one embodiment, the films are formed into shrink sleeve labels.

The various descriptive elements and numerical ranges disclosed herein can be combined with other descriptive elements and numerical ranges to describe preferred embodiments of the invention(s); further, for a given element, any upper numerical limit can be combined with any lower numerical limit described herein.

DETAILED DESCRIPTION OF THE INVENTION

The present invention(s) is directed to films, and more particularly, shrink films, and most particularly, shrink sleeve films that are ideal for use with highly contoured containers such as, for example, shampoo and detergent bottles, and drink containers. Disclosed in one aspect is a film comprising at least one skin layer, at least one core layer, and optionally at least one tie layer between each, wherein, independently, at least one skin layer comprises a solvent sealable material (capable of being dissolved by cyclic or linear ethers, linear or cyclic alkanes or alkenes, at 25° C., examples of which include tetrahydrofuran, 1,3-dioxolane, hexane, cyclohexane and benzene, and substituted versions thereof) such as a styrenic copolymer or a polyester copolymer. At least one core layer of the film consists essentially of from 0 to 30 wt %, by weight of the core layer, of polypropylene, and from 70 to 100 wt %, by weight of the core layer, of a random propylene-α-olefin copolymer. When present, at least one tie layer of the film comprises a skin layer- and core layer-adherable material such as a styrenic copolymer, a polar-modified polyolefin or an ethylene-ester copolymer.

Throughout the description and claims, when a copolymer is referred to as "comprising or including" an α-olefin, it is understood that the copolymer includes monomer units derived from the α-olefin. Thus, a propylene-α-olefin copolymer in one embodiment may be one where the α-olefin (α-olefin derived units) are said to be selected from ethylene, 1-hexene and 1-butene or other olefins.

In the preferred embodiment, the films described herein have at least 2 layers, and at least 3 in another embodiment, and at least 5 layers in a particular embodiment. The films typically have at least two skin layers that are bound to a tie layer on one face, and are unbound (face away from the film) on the other face. However, the films can include structures in which there are skin layers sandwiched between other layers. In certain embodiments, the skin layer(s) can be bound directly to the core, with no tie-layer in between. Preferably, there is a tie layer between each core layer and each skin layer that are otherwise adjacent to one another in the structure. If each skin layer is labeled "S", and each core layer labeled "C", and each tie layer labeled "T", then preferable film structures include, but are not limited to SCS, STC, STCT, STCTS, SSTCTS, STSCTSTS, SSTCCTSS, STSTCCTSTS, STTCTTS, SSSTCTS, SSTCTS, and other such structures. In the films described herein, each individual skin layer may be the same or different, preferably the same, in composition compared to other skin layers in the same film. Also, each core layer may be the same or different, and each tie layer may be the same or different. Furthermore, for example, there may be a skin layer in a film that does not meet the description of "comprising a styrenic copolymer or a polyester copolymer," as is also true of multiple tie and core layers. Thus, for example, the film structures above might be represented by $S^1T^1CT^2S^2$, $S^1S^2T^1CT^2S^1$, etc., wherein "$S^1$" and "$S^2$" are distinct from one another, meaning that they comprise different materials, and/or the same materials but in different ratios. The same is true for "$T^1$" and "$T^2$". Preferably, however, each skin layer, tie layer, and core layer that makes up a film will have a similar or identical identity, as this type of structure allows the use of only three extruders to melt blend and extrude the materials that form each layer of the film.

As used herein, the term "layer" refers to each of the one or more materials, the same or different, that are secured to one another in the form of a thin sheet or film by any appropriate means such as by an inherent tendency of the materials to adhere to one another, or by inducing the materials to adhere as by a heating, radiative, chemical, or some other appropriate process. The term "layer" is not limited to detectable, discrete materials contacting one another such that a distinct boundary exists between the materials. Preferably however, the materials used to make one layer of a film will be different (i.e., the weight percent of components, the properties of each component, and/or the identity of the components may differ) from the materials used to make an adjacent, and adhering, layer. The term "layer" includes a finished product having a continuum of materials throughout its thickness. The "films" described herein comprise three or more layers, and may comprise 3, 4, 5 or more layers in particular embodiments.

The films described herein have a utility as shrink films for use in labels, and in a particular embodiment, shrink films in which the transverse direction ("TD") of the film heat-shrinks to a greater extent than in the machine direction ("MD") of the films. Also, the films described herein undergo TD shrinkage of greater than 40% or 50% at desirably low temperatures; at less than 130° C. in one embodiment, and at less than 125° C. in another embodiment, and at less than 120° C. in yet another embodiment, and at less than 110° C. in yet another embodiment. In a particular embodiment, the TD shrinkage is greater than 40% or 50% at a given temperature within the range of from 110 to 115 or 120 or 125° C., while the MD shrinkage is less than 10 or 15% at a given temperature at the same temperature ranges. In another more particular embodiment, the TD shrinkage is greater than 40% or 50% at 121° C., while the MD shrinkage is less than 10% or 15% at the same temperature.

In certain embodiments, the films described herein are translucent or transparent, most particularly transparent. In one embodiment, a film as described herein having a thickness of from 40 to 60 μm possesses a Haze value (ASTM D1003) of less than 4 or 5 or 6 or 7 or 8 or 10%. In particular embodiments, the tie and skin layers are chosen such that, when formed with at least one core layer into a film, the overall film Haze value is less than 4 or 5 or 6 or 7 or 8 or 10%.

The 3, 4, 5, 6 or more layer film structures (films) may be any desirable thickness, and in certain embodiments have an average thickness within the range of from 20 or 30 or 40 to an upper limit of 50 or 60 or 80 or 100 or 150 or 200 or 500 μm. Thus, an exemplary average thickness is within the range of from 30 to 80 μm.

The materials that comprise each layer of the films described herein are elucidated by, but not limited to, the embodiments described below.

Core Layers

In certain embodiments, at least one core layer of the film consists essentially of within the range from 0 or 5 wt % to an upper limit of 25 or 30 wt % of polypropylene by weight of the core layer (i.e., the materials used to make up the core layer), and from 70 or 75 wt % to an upper limit of 95 or 100 wt % of a random propylene-α-olefin copolymer having within the range of from 1 or 2 wt % to an upper limit of 6 or 8 or 10 wt % α-olefins, the α-olefins selected from the group consisting of ethylene and $C_4$ to $C_{12}$ α-olefins. In a particular embodiment, the α-olefin of the random propylene-α-olefin copolymer is selected from the group consisting of ethylene, 1-butene and 1-hexene and mixtures thereof, and is ethylene in a more particular embodiment. Thus, in a particular embodiment the random copolymer is a random poly(propylene-co-ethylene).

In certain embodiments, the random propylene-α-olefin copolymer has a molecular weight distribution ("MWD", weight average molecular weight/number average molecular weight) within the range of from 1.2 or 1.5 or 1.8 to an upper limit of 3.5 or 4.0 or 4.5; and in other embodiments. The random propylene-α-olefin copolymer has a melting point within the range of from 110 or 115° C. to an upper limit of 130 or 135 or 145 or 150° C. In other embodiments, the random propylene-α-olefin copolymer described herein possess a narrow composition distribution (CD), thus, the comonomer distribution among the polymer chains is very uniform.

In one embodiment, at least one core layer consists essentially of the random propylene-α-olefin copolymer, and in a more particular embodiment, all core layers consist essentially of the random propylene-α-olefin copolymer. In yet another embodiment, at least one core layer consists essentially of the random propylene-α-ethylene copolymer, and in a more particular embodiment, all core layers consist essentially of the random propylene-α-ethylene copolymer. In such specific embodiments, the random propylene-α-olefin copolymer can be described by the same parameters as described in general for the random propylene-α-olefin copolymer. As it relates to the core layer, the phrase "consisting essentially of" does not exclude up to 3 wt % of additives.

The random propylene-α-olefin copolymer is one in which the α-olefin-derived units are spaced randomly along the polymer chain; in one embodiment, the catalyst and process used to make the random propylene-α-olefin copolymer is one where the growing copolymer exhibits the same or similar preference for propylene as it does for the comonomer. Thus, in a particular embodiment, the random propylene-α-olefin copolymer is produced using a metallocene catalyst. Such polymers having metallocene-related properties are described for example by A. K. Mehta, M. C. Chen and C. Y. Lin in 2 METALLOCENE-BASED POLYOLEFINS 464-488 (J. Scheirs and W. Kaminsky, eds., Wiley 2000). In this embodiment, the copolymer is referred to as a "m-propylene-α-olefin copolymer," that is, being produced (or "catalyzed") by a metallocene catalyst. The m-propylene-α-olefin copolymer can be described by the same parameters as for the propylene-α-olefin copolymer in general.

Metallocene catalysts include half (one cyclopentadienyl bound to a metal center) and full (two cyclopentadienyls bound to a metal center) sandwich compounds having one or more cyclopentadienyl ligands or ligands isolobal to cyclopentadienyl ("Cp") bonded to at least one metal atom, and one or more leaving group(s) bonded to the at least one metal atom. Example half-sandwich compounds are the so called "constrained geometry" metallocenes. The term "leaving group" includes any ligand that can be abstracted from a metallocene catalyst compound (typically using an activator) to form a metallocene catalyst cation capable of polymerizing one or more olefins, examples of which include a halide atom or alkyl group. The metallocene catalyst is typically used along with an activator such as an alumoxane or borate compound as is well known in the art, and one or both may be supported as is well known in the art. Any polymerization process known in the art can be used to make the m-propylene-α-olefin copolymer as long as the ideal properties described herein for the propylene-α-olefin copolymer are achieved.

The Cp ligands are generally represented by one or more bonding systems comprising π bonds that can be open systems or ring systems or fused system(s) or a combination thereof These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably, the ring(s) or ring system(s) are composed of carbon atoms such as but not limited to those cyclopentadienyl ligands or cyclopentadienyl-type ligand structures (structures isolobal to cyclopentadienyl). The metal atom is preferably selected from Groups 3 through 16 and the lanthanide or actinide series of the Periodic Table of Elements, and selected from Groups 4 through 12 in another embodiment, and selected from Groups 4, 5 and 6 in yet a more particular embodiment, and selected from Group 4 atoms in yet another embodiment, and is zirconium in a particular embodiment.

In certain embodiments, the random propylene-α-olefin copolymer has a melt flow rate ("MFR", 230° C., 2.16 kg, ASTM 1238) within the range of from 0.5 or 1 to an upper limit of 12 or 20 or 40 or 50 or 200 dg/min; an exemplary range is from 0.5 to 20 dg/min. In certain embodiments, the random propylene-α-olefin copolymer also has a xylene solubles value of less than 5 wt %, and less than 4 wt % in another embodiment, and less than 3 wt % in yet another embodiment, and less than 2 wt % in yet another embodiment (Soxhlet extraction at 23° C., 24 hours in xylene). In other embodiments, the random propylene-α-olefin copolymer possesses a Flexural Modulus (ASTM D790) within the range of from 300 or 400 to an upper limit of 900 or 1000 or 1200 MPa; where an exemplary value is within the range of from 300 to 1000 MPa.

As used herein, "polypropylene" refers to homopolymers comprising 100 wt % propylene-derived units and copolymers comprising within the range of from 0.01 wt % to an upper limit of 1 or 2 wt % comonomers, where the comonomer is selected from ethylene and $C_4$ to $C_{12}$ α-olefins, and preferably selected from ethylene, 1-butene and 1-hexene. The polypropylene can be made by any method known in the art. The polypropylene can have a melt flow rate (230° C., 2.16 kg, ASTM 1238) within the range of from 0.1 or 0.5 or 1.0 to an upper limit of 5.0 or 8.0 or 10 or 50 or 100 dg/min. Thus, an exemplary melt flow rate is within the range of from 1.0 to 8.0 dg/min.

In certain embodiments, the core may also include up to 1 or 2 or 3 wt %, by weight of the core layer, of additives such as antioxidants, antiblock agents, ultraviolet radiation absorbers, fillers such as talc, silica, alumina and clay, calcium carbonate and treated silica or nano-sized titanium or zirconium, or other additives known in the art; in a particular embodiment, such additives may be present in the core layer up to 3 wt % when the core consists essentially of the polypropylene (when present) and the propylene-α-olefin. In certain embodiments, void initiating particles are substantially absent from the core layer, meaning that they are present, if at all, to less than 1 wt % of the core layer, and not present in any detectable amount in another embodiment. Examples of void initiating particles include those made from polybutylene terephthalate, nylon-6, calcium carbonate, cyclic olefin copolymers particles, and other particles that are phase-distinct from the core layer material, and having a size that, during orientation, will create cavities in the core layer.

The core layer may be any desirable thickness, and in certain embodiments has an average thickness within the range of from 10 or 20 or 30 or 40 to an upper limit of 50 or 60 or 100 or 150 or 200 μm. Thus, an exemplary average overall film thickness is from 30 to 60 μm. In certain embodiments, the core layer comprises greater than 70 wt % of the total weight of the film (all layers combined), and comprises greater than 80 wt % in another embodiment.

Skin Layers

The one or more skin layers are layers of the film formed from materials that allow the final film to be solvent sealed (capable of being dissolved by cyclic or linear ethers, linear or cyclic alkanes or alkenes, at 25° C., examples of which include tetrahydrofuran, 1,3-dioxolane, hexane, cyclohexane and benzene, and substituted versions thereof), maintains a film Haze value as described above for the film, and can be processed under similar conditions as the core layer. In certain embodiments of the films described herein, at least one skin layer comprises a styrenic copolymer or a polyester copolymer. When stating "a styrenic copolymer" and "a polyester copolymer," mixtures of those materials within that class are contemplated along with the possibility of having only one such copolymer. Each skin layer in the film may comprise the same or different materials, and/or the same or different amounts of materials. In one embodiment, one or more skin layers is adjacent to only one tie layer; in another embodiment one or more skin layers is adjacent to two tie layers, sandwiched there between. When referring to a "styrenic copolymer" or a "polyester copolymer," it is understood that these terms include a blend of two or more "styrenic copolymers" or "polyester copolymers."

The term "styrenic copolymer" refers to copolymers comprising at least 50 wt % styrene-derived units by weight of the styrenic copolymer, and one or more other monomer units, examples of which include butadiene, ethylene, 1-butene, and propylene. In one embodiment, the styrenic copolymer is a block copolymer. The styrenic block copolymers contemplated for use herein are materials having blocks of monoalkenyl arene polymer and blocks of conjugated diene polymer. The polymer blocks have the general configuration: "A-B-A," and are arranged such that there are at least two monoalkenyl arene polymer end blocks "A" and at a least one elastomeric conjugated diene mid block "B". These polymer blocks can optionally be hydrogenated to eliminate the unsaturation in the mid block "B". The monoalkenyl arene blocks comprise from 50 or 60 or 65 to an upper limit of from 80 or 90 wt % of the block copolymer in one embodiment. Thus, an exemplary range of monoalkenyl arene copolymer blocks units is within the range of from 60 to 90 wt %.

The term "monoalkenyl arene" includes compounds of the benzene series such as styrene and its analogues and homologues including o-methyl styrene and p-methyl styrene, p-tert-butyl styrene, 1,3-dimethyl styrene, p-methyl styrene and other ring alkylated styrenes, particularly ring methylated styrenes, and other monoalkenyl polycyclic aromatic compounds such as vinyl naphthalene, vinyl anthrycene and the like. For the film layers described herein, the preferred monoalkenyl arenes are monovinyl, monocyclic arenes such as styrene and p-methyl styrene, styrene being particularly preferred.

In certain embodiments the amount of monoalkenyl arene does not exceed 95 wt % of the weight of the copolymer, nor comprise an amount less than 50 wt % of the copolymer. Preferred amounts of monoalkenyl arene in the block copolymer are within the range of from 50 or 55 or 60 wt % to an upper limit of from 75 or 80 or 90 or 95 wt %, the remainder made up of the "B" block, or other non-arene monomers. An exemplary range of arene is within the range of from 60 to 90 wt %. The block copolymers are optionally "oil extended" by the addition of a hydrocarbon oil and allows for improved processability. When present, the oils are present in amounts of between 10 to 40 wt % by weight of the styrenic block copolymer.

The block "B" comprises homopolymers of conjugated diene monomers, copolymers of two or more conjugated dienes, and copolymers of one or more of the dienes with a monoalkenyl arene as long as the blocks "B" are predominantly conjugated diene units. The conjugated dienes preferably used herein contain from 4 to 8 carbon atoms. Examples of such suitably conjugated diene monomers include: 1,3-butadiene (butadiene); 2-methyl-1,3-butadiene; isoprene; 2,3-dimethyl-1,3-butadiene; 1,3-pentadiene (piperylene); 1,3-hexadiene; combinations thereof, and the like. Hydrogenation of the unsaturated elastomer (Block B) results in a saturated tri-block copolymer (A-B-A).

In one embodiment the monoalkenyl arene polymer of the styrenic copolymer is polystyrene; and the preferred conjugated diene polymers are polybutadiene and polyisoprene, especially preferred being polybutadiene. A desirable styrenic copolymer for use in the skins described herein is polystyrene-co-polybutadiene copolymer (or "styrene-butadiene copolymer" or "SBS"). Other embodiments of the styrenic copolymer are hydrogenated versions of such styrenic block copolymers. Thus, in one embodiment, the styrenic block copolymer is selected from the group consisting of styrene-ethylene-ethylene-propylene-styrene block copolymers and styrene-ethylene-ethylene-butylene-styrene block copolymer, styrene-ethylene-propylene-styrene copolymer and mixtures thereof. A commercial embodiment of a desirable styrenic copolymer is K-Resin™ KR01, or any other injection molding K-Resin grade (Chevron Phillips), DK-11 or other film grade (Chevron Phillips) and EA3400 General purpose polystyrene (Chevron Phillips). Film grade styrenic copolymers are most preferred as the major component of the skin layer(s).

In certain embodiments, the styrenic copolymer used in the skin layer is the same as one or all of the styrenic copolymers of the tie layer, and are different in a particular embodiment. In one embodiment, the styrenic copolymer has a melt mass flow rate within the range of from 1 or 2 to an upper limit of 15 or 20 dg/min (200° C., 5.0 kg, ASTM 1238). In another embodiment, the styrenic copolymer has a Flexural Modulus (0.250 in, ASTM D790) of less than 2000 or 2500 MPa; and in the range of from 800 to 2500 MPa in yet another embodiment.

In another embodiment, the styrenic copolymer of the at least one skin layer comprises a styrenic copolymer having a Flexural Modulus (0.250 in, ASTM D790) of greater than 2500 MPa and a melt mass flow rate within the range of from 0.1 or 0.5 to an upper limit of from 5 or 15 or 20 dg/min (200° C., 5.0 kg). In another embodiment, the Flexural Modulus of this styrenic copolymer is within the range of from 2500 to 4000 MPa.

In another embodiment, the at least one skin layer consists of a blend within the range of from 60 to 95 wt %, by weight of the blend, of a styrenic copolymer possessing a Flexural Modulus (0.250 in, ASTM D790) of less than 2000 or 2500 MPa, and within the range of from 5 to 40 wt % of a styrenic copolymer possessing a Flexural Modulus (0.250 in, ASTM D790) of greater than 2500 or 3000 MPa.

As used herein, "polyester copolymers" refers to polymers which are saturated products coming from the condensation of at least glycols and dicarboxylic acids, or of their derivatives; thus, the term "copolymer" here also includes terpolymers, etc. Preferably, polyester copolymers comprise the products of the condensation of aromatic dicarboxylic acids having from 8 to 14 carbon atoms and of at least one glycol chosen from the group consisting of neopentyl glycol, cyclohexanedimethanol and aliphatic glycols represented by the formula $HO(CH_2)_nOH$ wherein "n" is an integer ranging from 2 to 10. Up to 50 mol % of the aromatic dicarboxylic acid may be replaced with at least one other aromatic dicarboxylic acid having from 8 to 14 carbon atoms, and/or up to 20 mol % may be replaced with an aliphatic dicarboxylic acid having from 2 to 12 carbon atoms.

Non-limiting examples of suitable polyester copolymers are polyethylene terephthalate (PET), polyethylene terephthalate glycol (PETG), poly(1,4-butylene) terephthalate (PBT), 1,4-cyclohexylene dimethylene terephthalate/isophthalate) and other esters derived from aromatic dicarboxylic acids such as isophthalic acid, dibenzoic acid, naphthalene dicarboxylic acid, 4,4'-diphenylenedicarboxylic acid, bis(p-carboxyphenyl)methane acid, ethylene bis(p-benzoic) acid, 1,4-tetramethylene bis(p-oxybenzoic) acid, ethylene bis (para-oxybenzoic) acid, 1,3-trimethylene bis(p-oxybenzoic) acid, and glycols such as ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol. In a particular embodiment, the polyester copolymer is polyethylene-terephthalate glycol copolymer. In certain embodiments, the melt flow index ("MFI", 250° C., 2.16 kg, ASTM 1238) of the suitable polyester copolymers are within the range of from 0.1 or 0.5 or 1 to an upper limit of 5 or 12 or 20 or 40 or 60 dg/min. The term "polyester copolymer" includes blends of various polyesters.

In certain embodiments, the polyester copolymers consist of several diacids and/or several diols. In certain embodiments, the polyester copolymers include copolyetheresters. These copolyetheresters are copolymers containing polyester blocks and polyether blocks, the polyether units derived in certain embodiments from polyetherdiols such as polyethylene glycol (PEG), polypropylene glycol (PPG) or polytetramethylene glycol (PTMG), dicarboxylic acid units such as terephthalic acid units and short, chain-extender, diol units such as glycol(ethanediol) or 1,4-butanediol. The linking of the polyethers with the diacids forms flexible segments whereas the linking of the glycol or butanediol with the diacids forms the rigid segments of the copolyetherester. The proportion of these copolyetheresters may represent up to 30 wt % of thermoplastic polyester. A commercial embodiment of a desirable polyester copolymer for use in the skin layer is Eastar™ 6763 (Eastman). Certain polylactic acid polymers would also be suitable as skin materials either alone or in a blend with the other polymers of the skin layer.

In certain embodiments, at least one skin layer also comprises an antiblock agent. In a particular embodiment, all skin layers comprise an antiblock agent. As used herein, an "antiblock" agent is any compound or mixture of compounds, minerals, treated minerals, etc. that is used in polyolefins to lower the tackiness of a material or blend of materials. Examples of antiblock agents include porous inorganic oxide materials, in one embodiment those from the Periodic Table of Elements of Groups 2, 3, 4, 5, 13 or 14 metal oxides, and most preferably Groups 4, 13 and 14. More particular examples of suitable antiblock agents include silica, alumina, silica-alumina, magnesia, titania, zirconia, and mixtures thereof are particularly desirable. Common talcs and clays can also be used. Commercial examples of suitable antiblock agents include Sibelite™ M4000 (Sibelco), a high purity silica, and other Sibelite silicas, as well as Sipernat™, Sylobloc™ and, Tospearl™ silicas, and Kaopolite™ silica-alumina can also be used as antiblock agents.

The antiblock agent can be added to the skin layers disclosed herein as a neat solid, a slurry in a liquid such as a hydrocarbon- or silicon-based processing oil, or as part of a masterbatch that can include, for example, polyolefinic polymers (low density polyethylene, high density polyethylene, polypropylene) polystyrene, etc, or be part of a thermoplastic vulcanizate as described further below. In the film layers described herein, there can be one or more different antiblock agents, "different" meaning that the antiblock agents each have a different structure and/or some other distinct property, but such that all of the antiblock agent fall within the broadest description of those agents herein. In one embodiment, each skin layer herein comprises from 0.01 or 0.05 or 0.1 wt % to an upper limit of 1 or 2 or 3 wt % of the antiblock agent by weight of the skin layer. Thus, an exemplary amount of antiblock in each skin layer is within the range of from 0.1 to 1 wt %.

In one embodiment, all of the skin layers comprise a polyester copolymer, and in another embodiment, all of the skin layers consist essentially of a polyester copolymer, and optionally an antiblock agent. In yet another embodiment, all of the skin layers comprise a styrenic copolymer, and in another embodiment, all of the skin layers consist essentially of a styrenic copolymer and optionally an antiblock agent.

In certain embodiments, ethylene-based polymers are substantially absent from the skin layers, or any layer of the films described herein in a particular embodiment, meaning that these polymers are present in an amount of no more than 1 wt % by weight of the skin layer, and not detectable in another embodiment. "Ethylene-based polymers" are those that comprise 60 wt % or more of ethylene-derived units. Also, in certain embodiments, propylene-based polymers are substantially absent from the skin layers, meaning that these polymers are present in an amount of no more than 1 wt % by weight of the skin layer, and not detectable in another embodiment. "Propylene-based polymers" are those that comprise 60 wt % or more of propylene-derived units.

In certain embodiments, silicon fluid is substantially absent from the skin layers, or any layer of the films described herein in a particular embodiment, meaning that the silicon fluids are present in an amount of no more than 1 wt % by weight of the skin layer, and not detectable in another embodiment. "Silicon fluids" include silicon polymers having a viscosity of greater than 25,000 cps in one embodiment, and greater than 300,000 cps (as measured by a Brookfield viscometer) in another embodiment.

In certain embodiments, hydrocarbon resins are substantially absent from the skin layers, or any layer of the films described herein in a particular embodiment, meaning that these resins are present in an amount of no more than 1 wt % by weight of the skin layer, and not detectable in another embodiment. "Hydrocarbon resins" are low molecular weight polymers/oligomers consisting of hydrocarbons, the resin having a softening point of less 90 to 130° C. (according to ASTM 1525; or DIN 1995-U4). Commercial examples of such hydrocarbon resins are DCPD resins (The Dow Chemical Co.), Escorez™ resins (ExxonMobil Chemical Co.) and Pyrolen™ resins (Lukoil).

In certain embodiments, each skin layer is within the range of from 0.5 or 1 μm to an upper limit of 6 or 10 or 12 or 14 or 20 μm in average thickness. Thus, an exemplary skin thickness is within the range of 1 to 6 μm.

Tie Layers

The tie layer can be any material or blend of materials that is suitable for adhering the skin and core layers together, as well as maintains a film haze as described above. In certain embodiments, at least one tie layer comprises a styrenic copolymer, a polar-modified polyolefin or an ethylene-ester copolymer. Preferably, there are one or more tie layers sandwiched between any core layer and any skin layer. The "styrenic copolymer" for use in the tie layer is as generally described above. Commercial embodiments of a desirable styrenic copolymer are K-Resin™ DK11, or other film grade K-Resins (Chevron Phillips) or a styrene-ethylene/butylene-styrene block copolymer ("SEBS") such as Kraton™ G series (Kraton Polymers USA), or an Asahi Tuftec™ styrenic copolymer.

The tie layer may comprise a copolymer (or blend thereof) of ethylene with an ester ("ethylene-ester") such as an ethylene/vinyl acetate copolymer, or an ethylene/methyl acrylate copolymer, an ethylene/n-butyl acrylate copolymer, or an ethylene/ethyl acrylate copolymer, for example. Ionomers (partially hydrolyzed ester derivatives) are also suitable as tie layer material, and can be used alone or in a blend with other tie layer materials. Alternatively, the tie layer may comprise a grafted polyolefin, and in particular a polyolefin having been grafted with a polar moiety-containing group ("polar-modified polyolefin"), such as a polyethylene or polypropylene backbone grafted with at least one ethylenically unsaturated carboxylic acid, carboxylic acid anhydride, or other derivative, as known in the art. Suitable carboxylic acids and carboxylic acid anhydrides include, but are not limited to, acrylic acid, methacrylic acid, and maleic acid or maleic anhydride (the latter generally used as grafting monomers). Suitable terpolymers may have the ethylene, ester, and acid or anhydride incorporated into a main chain of the polymer, or may comprise an ethylene/ester copolymer grafted with the acid or anhydride.

As used herein, "ethylene-ester copolymer" refers to a class of compounds that is formed by the polymerization of ethylene and vinyl-acrylates or vinyl acetates (collectively, "ester" groups). More particularly, ethylene-ester copolymers comprise ester-derived groups selected from structures $CH_2CR^1(R^2)$, wherein $R^1$ is selected from hydrogen and $C_1$ to $C_{10}$ alkyls; and $R^2$ is selected from —$OOCR^3$ groups and —$COOR^3$ groups; and wherein $R^3$ is selected from hydrogen and $C_1$ to $C_{10}$ alkyls. The ethylene-ester copolymers described herein comprise within the range of from 2 or 4 or 10 or 12 to an upper limit of 26 or 30 or 40 wt % ester-derived units, based on the weight of the ethylene-ester copolymers.

Ethylene vinyl-acetate copolymer is a common vinyl acetate copolymer. Ethylene vinyl acetate copolymers ("EVA") are polymers of ethylene-derived units with acetate-derived groups randomly distributed throughout the chains. As the level of vinyl-acetate derived units in the copolymer increases, the level of crystallinity found relative to the ethylene-derived units alone decreases from 60% to 10%. This yields products ranging from materials similar to low density polythene to flexible rubbers. Common grades can contain from 2% to 50% vinyl acetate. Clarity, flexibility, toughness and solvent solubility increase with increasing vinyl-acetate derived units in the EVA.

Some examples of useful "acetate" groups incorporated into the ethylene-ester copolymers include acetate ($CH_3COO$—), propylate ($CH_3CH_2COO$—), butyrate, benzoate ($C_6H_5COO$—), monofluoracetate, cyclohexyl carboxylate, carbomethoxy (—$COOCH_3$), carboethoxy (—$COOC_2H_5$), carbopropoxy, etc. Typical moieties $CH_2CH$— may thus include, for example, vinyl acetate, vinyl propylate, vinyl benzoate, methyl acrylate, ethyl acrylate, methyl methacrylate (in which one of the hydrogens of the formula is replaced by the methyl group), ethyl acrylate, etc.

Ethylene methyl-acrylate copolymer is a common vinyl-acrylate copolymer. These copolymers are formed by the polymerization of ethylene and alkyl-acrylates such as methyl acrylate $\{CH_2CH(COOCH_3)\}$ or ethyl acrylate $\{CH_2CH(COOCH_2CH_3)\}$, propyl acrylate, butyl acrylate, etc. Ethylene acrylic acid copolymer is another example of a common vinyl-acrylate copolymer.

The ethylene-ester copolymers that are useful in the tie layers described herein have a melt index ($I_2$, 190° C., 2.16 kg, ASTM 1238) within the range of from 0.05 or 0.08 or 0.1 or 0.15 to an upper limit of 2 or 5 or 8 or 10 dg/min in one embodiment. In certain embodiments, the ethylene-ester copolymers that are useful in the tie layers described herein have a density (ASTM D-1505) within the range of from 0.910 or 0.915 or 0.920 or 0.930 to an upper limit of 0.945 or 0.950 or 0.955 or 0.960 g/cm³. Thus, an exemplary density is within the range of from 0.930 to 0.950 g/cm³.

The ethylene-ester copolymers that are useful in the tie layers described herein have a 1% Secant Modulus MD (ASTM D 882, 100 μm film) within the range of from 10 or 20 or 30 to an upper limit of 70 or 80 or 100 MPa in one embodiment; and has a 1% Secant Modulus TD within the range of from 10 or 20 or 30 to an upper limit of 70 or 80 or 100 MPa in one embodiment. The ethylene-ester copolymers that are useful in the tie layers described herein also have an Elongation at Break (ASTM D882, 100 μm film) of greater than 200% in one embodiment, and greater than 300% in another embodiment, and greater than 400% in yet another embodiment, and within the range of from 100 to 1000% in one embodiment, and within the range of from 200 or 300 to an upper limit of 700 or 800% in yet another embodiment, in both TD and MD. Examples of commercially useful ethylene-ester copolymers include Escorene™ Ultra EVAs (ExxonMobil Chemical Co.).

The components that make up the tie layer can vary depending upon the application in which the films will be used, and also dependent upon the identity of the skin layer. Typically, a tie layer will be chosen that is compatible with both the propylene-based core layer and the skin layer. In one embodiment, when the skin layer comprises a styrenic copolymer, the tie layer consists of a styrenic copolymer; and in another embodiment, when the skin layer comprises a polyester copolymer, the tie layer consists of an ethylene-ester copolymer or a polar-modified polyolefin, or a blend of the two.

Commercial examples of other suitable tie layer materials include maleic anhydride modified ethylene-vinyl acetate, such as Bynel™ E418 adhesive resin (DuPont), and an Escor™ ATX 325 acid terpolymer (ExxonMobil Chemical), which is an ethylene-based resin having both ester and acrylic acid functionality, and Admer™ AT1955A modified polyolefin (Mitsui), or Bynel™ resins (DuPont) or SE810 resins (Mitsui).

In certain embodiments, the average thickness of the tie layer is within the range of from 0.5 or 1 to an upper limit of 4 or 5 or 6 μm. Thus, an exemplary tie layer average thickness is within the range of from 1 to 6 μm.

Process to Manufacture

The films described herein can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the "tentered" method. In the tentered process, line speeds of greater than 100 m/min to 400 m/min or more, and outputs of greater than 2000 kg/hr to 4000 kg/hr or more are achievable. In the tenter process, sheets/films of the various materials are melt blended and coextruded, such as through a 3, 4, 5, 7-layer die head, into the desired film structure. Extruders ranging in diameters from 70 or 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation ("MDO"). It is understood by those skilled in the art that this temperature range can vary depending upon the equipment, and in particular, upon the identity and composition of the components making up the film. Ideally, the temperature will be below that which will melt the film, or cause it to become tacky and adhere to the equipment, but high enough to facilitate the machine direction orientation process. Such temperatures referred to herein refer to the film temperature itself. The film temperature can be measured by using, for example, InfraRed spectroscopy, the source aimed at the film as it is being processed; those skilled in the art will understand that for transparent films, measuring the actual film temperature will not be as precise. In this case, those skilled in the art can estimate the temperature of the film by knowing the temperature of the air or roller immediately adjacent to the film measured by any suitable means. The heating means for the film line may be set at any appropriate level of heating, depending upon the instrument, to achieve the stated film temperatures.

The lengthened and thinned film is cooled and passed to the tenter section of the line for transverse direction orientation ("TDO"). The TD tenter section has at least three zones that can be temperature controlled, and the temperatures stated herein for TDO are the zone temperatures. First, the edges of the sheet are grasped by mechanical clips on continuous chains and pulled into a long, precisely controlled hot air oven for a pre-heating step. The zone temperature ranges from 100 or 110 to 150 or 170 or 180° C. in the pre-heating step. Again, the temperature will be below that which will melt the film, or cause it to become tacky and adhere to the equipment, but high enough to facilitate the step of transverse direction orientation. Next, the edges of the sheet are grasped by mechanical clips on continuous chains and pulled into a long, precisely controlled hot air oven for transverse stretching, or "stretching zone". As the tenter chains diverge a desired amount to stretch the film in the transverse direction, the stretching zone temperature is lowered 2 or 5 to 15 or 20 or 30 to 40° C. below the pre-heating step zone temperature. After stretching to achieve transverse orientation in the film, the film is then cooled in an "anneal" or "cooling" zone from 5 to 10 or 15 or 20 or 30 or 40° C. below the stretching zone temperature, holding or slightly decreasing (by no more than 5%) the amount of stretch, followed by releasing the clips prior to edge trim, optional coronal, printing and/or other treatment can then take place, followed by winding.

Thus, TD orientation is achieved by the steps of pre-heating the film having been machine oriented, followed by stretching at a lower temperature, and then followed by a cooling step at a lower temperature. In one embodiment, the films described herein are formed by imparting a transverse orientation by a process of first pre-heating the film, followed by a decrease in the film temperature within the range of from 2 or 5° C. to 10 or 15 or 20 or 30 or 40° C. relative to the pre-heating temperature while performing transverse orientation of the film, followed by a further lowering of the film temperature within the range of from 5° C. to 10 or 15 or 20 or 30 or 40° C. relative to the stretching temperature. The latter step helps to impart the high TD shrink characteristics of the films described herein. Thus, for example, where the pre-heat zone temperature is 118° C., the stretch zone temperature may be 108° C., and the cooling zone may be 93° C., or any temperature within the ranges disclosed. The steps are carried out for a sufficient time to affect the desired film properties as those skilled in the art will understand.

In the films described herein, the films are drawn from 1.1 to 2 or 2.5-fold in the machine direction, and from 4 or 5 to 8 or 9 or 10-fold in the transverse direction. The oriented films can then be sealed using a hot melt adhesive or sealed using a solvent such as tetrahydrofuran, preferably solvent sealed, to form a tube or "sleeve" that can be heat-shrinked onto a bottle or other article to form a label on the bottle.

The thickness and identity of the skin and tie layers are chosen in certain embodiments to maintain a desirable Tensile Strength of the films. In certain embodiments, the films described herein have a TD Tensile Strength (ASTM 882) of from 100 or 125 MPa to an upper limit of 350 or 400 MPa. In certain embodiments, the films described herein have a MD Tensile Strength of from 20 or 25 MPa to an upper limit of 55 or 60 or 70 MPa. Thus, an exemplary range of MD tensile strength is within the range of from 20 to 60 MPa, and 125 to 400 MPa for TD tensile strength.

Thus, in one aspect of the films described herein is a film comprising at least one core layer, at least one skin layer, and one tie layer between the two, wherein the core comprises (and consists essentially of in a particular embodiment) from 0 to 30 wt % of polypropylene by weight of the core layer, and from 70 to 100 wt % of a random propylene-α-olefin copolymer comprising within the range of from 1 to 10 wt % α-olefins, the α-olefin selected from the group consisting of ethylene and $C_4$ to $C_{12}$ α-olefins, the random propylene-α-olefin copolymer also having an MWD within the range of from 1.2 to 4.5 and a melting point within the range of from 110 to 150° C.; wherein the film possesses a TD Tensile Strength of from 100 to 400 MPa and a MD Tensile Strength of from 20 to 70 MPa. In a particular embodiment, the Haze value of this film is less than 10%. In yet a more particular embodiment, the tie layer comprises a skin and core layer-adherable material. In yet another particular embodiment the skin layer comprises a solvent sealable material, wherein the solvent is tetrahydrofuran or similar solvent capable of at least partially dissolving styrenic and/or polyester copolymers as described herein. Other embodiments of the film, skin layer, core layer and tie layers are described herein. In certain embodiments of this aspect of the film, ethylene-based polymers are substantially absent from the core layer; and in yet another embodiment, hydrocarbon resins are substantially absent from the core layer.

The films described herein have utility in many applications. Certain applications are ideal such as, for example, labeling, covering, and/or packaging of materials such as bottles, tubes and other cylindrical articles, especially bottles, tubes and cylindrical articles having a contoured shape. Other uses of the films include covering boxes, plates and other vessels.

In certain applications of the films it is desirable to affect shrinkage along a single axis without substantial shrinkage in the other axis, which the films described herein are capable of. For example, in the process of labeling bottles by shrinking a tube of heat shrinkable material, if the film shrinks too much along its length, the label may not be positioned correctly but rather placed above the desired position upon shrinkage. This problem is solved in the current films. Moreover, printing and other conversion processes of such label surfaces require heat stability in at least one direction, preferably both directions, to meet machinability requirements. Ideally, the films should not shrink during processing, handling and shipment; and preferably, the films shrink only when induced to shrink as by heating the film when it is applied to a surface to be used as a label, etc.

Of further utility of the films is their overall lower density than the density of the materials to which they are associated with (bottle, container, etc.), thus facilitating recovery of the label (film) from the article to which it is attached. This is accomplished in part by the use of polyolefin-based core layers, and further, the predominance of the polyolefin over other higher density materials. Thus, in certain embodiments of the invention, the core layer(s) of the films comprise at least 70 wt % of the total weight of the multilayered film, and comprises at least 80 wt % in another embodiment.

Examples

Tables 1-3 below demonstrate non-limiting examples of 5-layer film structures described herein, with the average thickness of each film layer and material components of that layer described in rows representing individual layers of "STCTS" structures (C=core, S=skin, T=tie-layer). In the tables, "KR-01" is K-Resin KR-01 styrene-butadiene copolymer (Chevron Phillips); the "GPPS" is EA3400 general purpose polystyrene (Chevron Phillips); "DK-11" is K-Resin DK-11 styrene-butadiene copolymer (Chevron Phillips); "Eastar 6763" is a polyester teraphthalate glycol polymer (Eastman); and "Admer AT1955A" is a polar-group modified polyolefin elastomer (Mitsui). The "antiblock" in Examples 1 and 2 was a masterbatch of 30 wt % microcrystalline silica; the masterbatch was added such that the antiblock was present in the skin layers at about 0.6 wt %. The "SEBS" used in the tie layers of Example 3 was Asahi Tuftec H1041. Also in Example 3, an antiblock masterbatch (SKR-17) was present in the skins.

The "m-random propylene-α-olefin copolymer" in Examples 1, 2 and 3 are metallocene-produced random propylene-α-olefin copolymer EOD01-05 with a melt flow rate (230/2.16) of 8 dg/min and EOD03-01 with melt flow rate (230/2.16) of 3 dg/min (Total), both with a melting point of about 117-123° C. and density of about 0.895 g/cm³. The propylene homopolymer in Example 3 is Total 3371.

The coextrusions and film production was performed using an pilot tentering line with a 3.5 inch extruder having a 32/1 L/D ratio single screw extruder having a 40/80/100/40 mesh multi-screen, and the die having a die gap of 2-4 mm, the film then oriented in a tenter orientation process of a line speed of about 20-30 meters/min. Within the feed block, the film materials were layered to form the multi-layer melt stream. The melt stream was fed into a slot cast sheet die or other type of die to form the multi-layer sheet. As the sheet exits the die, it was immediately cooled by use of a cooling drum and/or a water bath at a temperature of about 55 to 60° C.

Immediately after cooling, the composite sheets were fed into an apparatus for MD orientation of plastic material. The composite sheets were fed into a set of differential speed heated rollers to stretch the sheet in the machine direction to a degree of about 1.3-fold at a temperature of about 88° C. Next, the sheet was fed to a tenter frame where it was first preheated to a temperature of about 125° C. (115-135° C.), followed by stretching in the transverse direction to a degree of about 8-fold at a temperature of about 117° C. (107-127° C.), followed by a cooling step at about 97° C. (93-103° C.), where the rails were brought in together slightly.

Finally, the sheet can optionally be subjected to corona discharge treatment in the known manner to improve its surface characteristics particularly its printability. The composition of each film is shown in Tables 1-3.

TABLE 1

Example Film 1

| Layer | Thickness μm | Composition |
|---|---|---|
| S | 4 | SBS copolymer (KR-01) + 20% GPPS + antiblock |
| T | 2 | SBS copolymer (DK-11) |
| C | 39 | m-random propylene-α-olefin copolymer |
| T | 2 | SBS copolymer (DK-11) |
| S | 4 | SBS copolymer (KR-01) + 20% GPPS + antiblock |

TABLE 2

Example Film 2

| Layer | Thickness μm | Composition |
|---|---|---|
| S | 4 | PETG (Eastar 6763) + antiblock |
| T | 2 | polar-modified polyolefin (Admer AT1955A) |
| C | 39 | m-random propylene-α-olefin copolymer |
| T | 2 | polar-modified polyolefin (Admer AT1955A) |
| S | 4 | PETG (Eastar 6763) + antiblock |

TABLE 3

Example Film 3

| Layer | Thickness μm | Composition |
|---|---|---|
| S | 5.1 | SBS copolymer (KR-01) + antiblock |
| T | 1 | SEBS |
| C | 39 | m-random propylene-α-olefin copolymer + 25% PP |
| T | 1 | SEBS |
| S | 5.1 | SBS copolymer (KR-01) + antiblock |

The percentage of shrink (dimensional stability) was measured according to a modified version of ASTM D1204. The two tests follow the same principles but differ in some specific protocols. According to EMCT Procedure, the measurement test involves placing a 2.54 cm by 17.78 cm film sample in a convection oven controlled to a target temperature (typically 135° C.) for 7 minutes and reporting the change from the original dimension as a percentage value. For MD shrink %, the sample is long (17.78 cm) in the MD direction and short (2.54 cm) in the TD direction and vice versa for TD shrink %. Thus, MD shrink percentage=(initial MD dimension−final MD dimension)/(initial MD dimension)]×100. For low to non-shrink polypropylene films, percent dimensional stability is reported instead of shrink percentage. MD percent dimensional stability=[(final MD dimension−initial MD dimension)/(initial MD dimension)]×100.

Other test methods include:
Tensile modulus and ultimate tensile strength was measured according to ASTM D882.
Film thickness was measured using a micrometer or laser micrometer and is reported as an average thickness.
Haze is reported as a percentage (%), was measured as specified by ASTM D1003.
Elongation was measured according to ASTM D882.
Gurley Stiffness was measured according to ASTM D6125, Tappi T 543, units in mg of force. Shorter samples are used than indicated in Tappi and ASTM, since OPP films are in the lower end of the measurable range, 2×1 inch samples used.

TABLE 4

Biaxially oriented film properties

| Example No. | Dimensional stability, % MD/TD 107° C. | Dimensional stability, % MD/TD 121° C. | Dimensional stability, % MD/TD 135° C. | Haze, % | Gurley Stiffness, MD/TD | Modulus, MPa MD/TD | Tensile Strength, MPa MD/TD |
|---|---|---|---|---|---|---|---|
| 1 | 1/−40 | 3/−74 | −1/−79 | 1.1 | 8.9/10.7 | 1221/1318 | 28/172 |
| 2 | −0/−33 | 4/−70 | 2/−78 | 3.9 | 8.9/9.6 | 1118/1387 | 28/150 |
| 3 | −1/−23 | −1/−44 | −2/−65 | 1.8 | 7.1/10.4 | 1070/1684 | 37/212 |

Comparative Examples

While it is possible to use a wide variety of polyolefin core resin blends, many do not provide a good balance of fitness-for-use properties and operability. Comparative Examples 4-7 illustrate some core blends that did not perform as well. The films were formed in a similar manner as described for the Inventive Examples. The identity of the components is as described in Tables 5-7, except for the core components which are identified in the tables. The "metallocene-catalyzed, random EP copolymer (Tm~114° C.)" and "metallocene-produced, random EP copolymer (Tm~117-123° C.)" are both metallocene produced copolymer having the stated melting point (or range). General comments about the films' performance is summarized in Table 9.

TABLE 5

Comparative Example 4 Film Structure

| Layer | Thickness μm | Composition |
|---|---|---|
| S | 4 | SBS Copolymer (DK-11) + Antiblock |
| T | 1 | SEBS (Asahi H1041) |
| C | 41 | Ziegler-Natta catalyzed, random EP copolymer (Total 8573) (Tm = 135° C.) |
| T | 1 | SEBS (Asahi H1041) |
| S | 4 | SBS Copolymer (DK-11) + Antiblock |

TABLE 6

Comparative Example 5 Film Structure

| Layer | Thickness μm | Composition |
|---|---|---|
| S | 5 | SBS Copolymer (DK-11) + Antiblock |
| T | 1 | SEBS (Asahi H1041) |
| C | 39 | 50% metallocene-produced, random EP copolymer (Tm ~117-123° C.) + 50% PP (Total 3371) |
| T | 1 | SEBS (Asahi H1041) |
| S | 5 | SBS Copolymer (DK-11) + Antiblock |

TABLE 7

Comparative Example 6 Film Structure

| Layer | Thickness μm | composition |
|---|---|---|
| S | 1 | EP copolymer (Total 8573) |
| C | 49 | 85% metallocene-produced, random EP copolymer (Tm ~114° C.) + 15% hydrocarbon resin ($T_{soft}$ = 120° C.) |
| S | 1 | EP copolymer (Total 8573) |

TABLE 8

Comparative Example 7 Film Structure

| Layer | Thickness μm | Composition |
|---|---|---|
| S | 1.3 | EP copolymer (Total 8573HB) |
| C | 48 | 70% LDPE (ExxonMobil LD071.LR, Tm = 113° C.) + 30% LLDPE (ExxonMobil LL3002.32, Tm = 124° C.) |
| T | 1.3 | EP copolymer (Total 8573HB) |

TABLE 9

General Results of Comparative Films

| Comparative Example No. | Core Resin | Results |
|---|---|---|
| 4 | 100% Z-N EP copolymer | Poor operability, low web strength |
| 5 | ≥50% PP | High shrink initiation temperatures |
| 6 | m-EP copolymer + HCR | Low stiffness, poor operability, high MD shrink |
| 7 | LDPE + LLDPE | High MD shrink, poor mechanical properties and web strength |

A summary of physical properties for Comparative examples 5-7 are shown in Table 10. Comparative example 4 could not even be produced, due poor web strength that resulted in splits in the TDO oven. Comparative Example 5 has improved mechanical properties and good operability, but shrink initiation temperature (minimum temperature to get shrinkage of the film in the TD) is shifted significantly higher and TD is still less than 50% at 135° F. Comparative Example 6 exhibited poorer melt strength as compared to 100% m-EP copolymer core, making it harder to produce. Addition of hydrocarbon resin ("HCR") to the core also compromised stiffness and increased MD shrink significantly. Comparative example 7 was also difficult to produce due to poor web strength and casting issues, and is evident in low mechanical strength properties.

TABLE 10

| Comparative Example Properties | | | | | | | |
|---|---|---|---|---|---|---|---|
| Comparative Example | Dimensional stability, % MD/TD | | | | Gurley Stiffness | Modulus, MPa | Tensile, MPa |
| No. | 107° C. | 121° C. | 135° C. | Haze % | MD/TD | MD/TD | MD/TD |
| 5 | −3/−24 | −5/−35 | −7/−48 | 3.3 | 7.8/10.0 | 1166/1566 | 41/155 |
| 6 | −3/−21 | −13/−48 | −26/−63 | 2.3 | 5.1/8.8 | 1028/1145 | 40/163 |
| 7 | −2/−31 | −11/−72 | −15/−71 | 3.4 | 6.4/8.5 | 642/821 | 24/87 |

Having described the various features of the inventive films, one aspect described in numbered embodiments is:

1. A film comprising at least one skin layer, at least one core layer, and optionally at least one tie layer between each, and having at least one tie layer between each in a particular embodiment, wherein, independently,
   (a) at least one skin layer comprises a solvent sealable material;
   (b) at least one core layer comprises (or "consists essentially of" in a certain embodiments):
      (i) from 0 to 30 wt %, by weight of the core layer, of polypropylene, and
      (ii) from 70 to 100 wt % of a random propylene-α-olefin copolymer having within the range of from 1 to 10 wt % α-olefins, by weight of the copolymer, the α-olefin selected from the group consisting of ethylene and $C_4$ to $C_{12}$ α-olefins, and having an MWD within the range of from 1.2 to 4.5 and a melting point within the range of from 110 to 150° C.
2. The film of embodiment 1, wherein the MWD of the random propylene-α-olefin copolymer is within the range from 1.5 to 4.0.
3. The film of embodiments 1 and 2, wherein the random propylene-α-olefin copolymer is produced using a metallocene catalyst composition.
4. The film of any of the previous numbered embodiments, wherein the melting point of the random propylene-α-olefin copolymer is within the range of from 115 to 130° C.
5. The film of any of the previous numbered embodiments, wherein when the skin layer comprises a styrenic copolymer, the tie layer consists of a styrenic copolymer; and wherein when the skin layer comprises a polyester copolymer, the tie layer consists of an ethylene-ester copolymer or a polar-modified polyolefin.
6. The film of any of the previous numbered embodiments, wherein the core layer consists essentially of the random propylene-α-olefin copolymer.
7. The film of any of the previous numbered embodiments, wherein the TD shrinkage is greater than 40% at from 110 to 125° C., while the MD shrinkage is less than 15% at the same temperature range.
8. The film of any of the previous numbered embodiments, wherein at least on tie layer is present between the core and skin layers, the least one tie layer comprising a styrenic copolymer, a polar-modified polyolefin, or a ethylene-ester copolymer.
9. The film of any of the previous numbered embodiments, wherein the film having a thickness within the range of from 40 to 60 μm has a Haze value of less than 10%.
10. The film of any of the previous numbered embodiments, wherein the random propylene-α-olefin copolymer has a melt flow index (230° C., 2.16 kg) within the range of from 0.5 to 200 dg/min.
11. The film of any of the previous numbered embodiments, wherein the random propylene-α-olefin copolymer has a melt flow index (230° C., 2.16 kg) within the range of from 1 to 50 dg/min.
12. The film of any of the previous numbered embodiments, wherein each skin layer is within the range of from 0.5 to 12 μm in average thickness.
13. The film of any of the previous numbered embodiments, wherein each styrenic copolymer has within the range of from 50 to 90 wt % styrene-derived units and a melt mass flow rate within the range of from 1 to 20 dg/min (200° C., 5.0 kg).
14. The film of any of the previous numbered embodiments, wherein each styrenic copolymer has a Flexural Modulus (0.250 in, ASTM D790) of less than 2500 MPa.
15. The film of any of the previous numbered embodiments, wherein the styrenic copolymer of each skin layer comprises a styrenic copolymer having a Flexural Modulus (0.250 in, ASTM D790) of greater than 2500 MPa and a melt mass flow rate within the range of from 1 to 20 dg/min (200° C., 5.0 kg).
16. The film of any of the previous numbered embodiments, wherein each skin layer consists of a blend within the range of from 60 to 95 wt %, by weight of the blend, of a styrenic copolymer possessing a Flexural Modulus (0.250 in, ASTM D790) of less than 2500 MPa, and within the range of from 5 to 40 wt % of a styrenic copolymer possessing a Flexural Modulus (0.250 in, ASTM D790) of greater than 2500 MPa.
17. The film of any of the previous numbered embodiments, wherein the styrenic copolymer is styrene-butadiene copolymer.
18. The film of any of the previous numbered embodiments, wherein the polyester copolymer is a polyethylene-terephthalate glycol copolymer.
19. The film of any of the previous numbered embodiments, wherein each skin layer also comprises an antiblock agent.
20. The film of any of the previous numbered embodiments, wherein ethylene-based polymers are substantially absent from the skin layers.
21. The film of any of the previous numbered embodiments, wherein propylene-based polymers are substantially absent from the skin layers.
22. The film of any of the previous numbered embodiments, wherein, the at least one skin layer comprises a styrenic copolymer or a polyester copolymer.
23. The film of any of the previous numbered embodiments, wherein the film is biaxially oriented.
24. A sleeve label comprising the film of any of the previous numbered embodiments.
25. A film comprising at least one core layer, at least one skin layer, and optionally at least one tie layer between the two, wherein the core consists essentially of from 0 to 30 wt % polypropylene by weight of the core layer, and from 70 to 100 wt % of a random propylene-α-olefin copolymer comprising within the range of from 1 to 10 wt % α-olefins, the α-olefin selected from the group consisting of ethylene and $C_4$ to $C_{12}$ α-olefins, and having an MWD within the range of from 1.2 to 4.5 and a melting point within the range of from 110 to 150° C.; wherein the film possesses a TD Tensile Strength of from 100 to 400 MPa and a MD Tensile Strength within the range of from 20 to 70 MPa.

26. The film of embodiment 25, wherein the at least one skin layer comprises a solvent sealable material.

27. A process for forming a biaxially oriented film of any of the previously numbered embodiments comprising coextruding at least one core layer, one skin layer, and optionally one tie layer between the two to form an unoriented film, followed by drawing the unoriented film from 1.1 to 2.5-fold in the machine direction and from 4 to 10-fold in the transverse direction in a tenter apparatus having at least three zones; followed by isolating a biaxially oriented film; wherein transverse orientation is imparted to the film by first pre-heating the film in a pre-heating zone, followed by a decrease in the temperature in a stretching zone within the range of from 2 to 40° C. relative to the pre-heating zone temperature while performing transverse orientation (stretching) of the film, followed by a further lowering of the temperature in a cooling zone within the range of from 5 to 40° C. relative to the stretching zone temperature.

28. The process of numbered embodiment 27, wherein the core consists essentially of from 0 to 30 wt %, by weight of the core layer, of polypropylene, and from 70 to 100 wt % of a random propylene-α-olefin copolymer having within the range of from 1 to 10 wt % α-olefins, the α-olefin selected from the group consisting of ethylene and $C_4$ to $C_{12}$ α-olefins, and having an MWD within the range of from 1.2 to 4.5 and a melting point within the range of from 110 to 150° C.

29. A biaxially oriented film of any of the preceding numbered embodiments 1-26, comprising at least one skin layer, at least one core layer, and optionally at least one tie layer between each, wherein, independently,
(a) at least one skin layer comprises a solvent sealable material;
(b) at least one core layer comprises
(i) from 0 to 30 wt %, by weight of the core layer, of polypropylene, and
(ii) from 70 to 100 wt %, by weight of the core layer, of a random propylene-α-olefin copolymer having within the range of from 1 to 10 wt % α-olefins, by weight of the copolymer, the α-olefin selected from the group consisting of ethylene and $C_4$ to $C_{12}$ α-olefins, and having an MWD within the range of from 1.2 to 4.5 and a melting point within the range of from 110 to 150° C.;
wherein the film has been oriented from 1.1 to 2.5-fold in the machine direction and from 4 to 10-fold in the transverse direction.

In another aspect is provided the use of a film as a label comprising at least one skin layer, at least one core layer, and at least one tie layer between each, wherein, independently, (a) at least one skin layer comprises a solvent sealable material; (b) at least one core layer consists essentially of (i) from 0 to 30 wt %, by weight of the core layer, of polypropylene, and (ii) from 70 to 100 wt % of a random propylene-α-olefin copolymer having within the range of from 1 to 10 wt % α-olefins, by weight of the copolymer, the α-olefin selected from the group consisting of ethylene and $C_4$ to $C_{12}$ α-olefins, and having an MWD within the range of from 1.2 to 4.5 and a melting point within the range of from 110 to 150° C.; and (c) at least one tie layer comprises a styrenic copolymer, a polar-modified polyolefin, or a ethylene-ester copolymer.

What is claimed is:

1. A film comprising at least one skin layer, at least one core layer, and at least one tie layer between each, wherein, independently,
   (a) at least one skin layer comprises a solvent sealable material;
   (b) at least one core layer consisting essentially of
      (i) from 0 to 30 wt %, by weight of the core layer, of polypropylene, and
      (ii) from 70 to 100 wt %, by weight of the core layer, of a random propylene-α-olefin copolymer having within the range of from 1 to 10 wt % α-olefins, by weight of the copolymer, the α-olefin selected from the group consisting of ethylene and $C_4$ to $C_{12}$ α-olefins, and having an MWD within the range of from 1.2 to 4.5;
      (iii) and optionally up to 3 wt %, by weight of the core layer, of additives;
   wherein the TD shrinkage is greater than 40% at 121° C., while the MD shrinkage is less than 15% at the same temperature; a TD Tensile Strength (ASTM 882) of from 100 MPa to an upper limit of 400 MPa when stretched at a temperature of from 110° C. to 170° C., and a MD Tensile Strength of from 20 MPa to an upper limit of 70 MPa;
   wherein the core layer comprises greater than 70 wt % of the total weight of the film (all layers combined); and
   wherein when the skin layer(s) comprise a styrenic copolymer, the tie layer(s) consist of a styrenic copolymer; and wherein when the skin layer comprises a polyester copolymer, the tie layer consists of a polar-modified polyolefin.

2. The film of claim 1, wherein the MWD of the random propylene-α-olefin copolymer is within the range from 1.5 to 4.0.

3. The film of claim 1, wherein the random propylene-α-olefin copolymer is produced using a metallocene catalyst composition.

4. The film of claim 1, wherein the melting point of the random propylene-α-olefin copolymer is within the range of from 115 to 130° C.

5. The film of claim 1, wherein the at least one tie layer comprises a styrenic copolymer, or a polar-modified polyolefin.

6. The film of claim 1, wherein the core layer consists essentially of the random propylene-α-olefin copolymer.

7. The film of claim 1, wherein the TD shrinkage is greater than 50% at a given temperature within the range of from 110 to 125° C., while the MD shrinkage is less than 10% at a given temperature within the same temperature range.

8. The film of claim 1, wherein the film having a thickness within the range of from 40 to 60 μm has a Haze value of less than 10%.

9. The film of claim 1, wherein the random propylene-α-olefin copolymer has a melt flow index (230° C., 2.16 kg) within the range of from 0.5 to 200 dg/min.

10. The film of claim 1, wherein the random propylene-α-olefin copolymer has a melt flow index (230° C., 2.16 kg) within the range of from 1 to 50 dg/min.

11. The film of claim 1, wherein each skin layer is within the range of from 0.5 to 12 μm in average thickness.

12. The film of claim 1, wherein each styrenic copolymer has within the range of from 50 to 90 wt % styrene-derived units and a melt mass flow rate within the range of from 1 to 20 dg/min (200° C., 5.0 kg).

13. The film of claim 12, wherein each styrenic copolymer has a Flexural Modulus (0.250 in, ASTM D790) of less than 2500 MPa.

14. The film of claim 12, wherein the styrenic copolymer of each skin layer comprises a styrenic copolymer having a Flexural Modulus (0.250 in, ASTM D790) of greater than 2500 MPa and a melt mass flow rate within the range of from 1 to 20 dg/min (200° C., 5.0 kg).

15. The film of claim 12, wherein the styrenic copolymer is styrene-butadiene copolymer.

16. The film of claim 12, wherein the polyester copolymer is a polyethylene-terephthalate glycol copolymer.

17. The film of claim 1, wherein each skin layer also comprises an antiblock agent.

18. The film of claim 1, wherein ethylene-based polymers are substantially absent from the skin layers.

19. The film of claim 1, wherein propylene-based polymers are substantially absent from the skin layers.

20. The film of claim 1, wherein, the at least one skin layer comprises a styrenic copolymer or a polyester copolymer.

21. A sleeve label comprising the film of claim 1.

* * * * *